United States Patent
Cardinaux et al.

(10) Patent No.: US 12,072,951 B2
(45) Date of Patent: Aug. 27, 2024

(54) APPARATUS AND METHOD FOR TRAINING NEURAL NETWORKS USING WEIGHT TYING

(71) Applicant: SONY CORPORATION, Tokyo (JP)

(72) Inventors: Fabien Cardinaux, Stuttgart (DE); Stefan Uhlich, Stuttgart (DE); Thomas Kemp, Stuttgart (DE); Javier Alonso Garcia, Stuttgart (DE); Kazuki Yoshiyama, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 1625 days.

(21) Appl. No.: 15/903,290

(22) Filed: Feb. 23, 2018

(65) Prior Publication Data

US 2018/0253401 A1  Sep. 6, 2018

(30) Foreign Application Priority Data

Mar. 2, 2017 (EP) ..................... 17158959

(51) Int. Cl.
| | |
|---|---|
| G06F 17/16 | (2006.01) |
| G06N 3/045 | (2023.01) |
| G06N 3/063 | (2023.01) |
| G06N 3/08 | (2023.01) |

(52) U.S. Cl.
CPC ............... *G06F 17/16* (2013.01); *G06N 3/08* (2013.01); *G06N 3/045* (2023.01); *G06N 3/063* (2013.01)

(58) Field of Classification Search
CPC ........ G06F 17/16; G06N 3/08; G06N 3/0454; G06N 3/063; G06N 3/045
See application file for complete search history.

(56) References Cited

U.S. PATENT DOCUMENTS

| | | | |
|---|---|---|---|
| 7,218,270 B1* | 5/2007 | Tamburino ............ | G01S 13/726 342/90 |
| 2003/0028359 A1 | 2/2003 | Eggert et al. | |
| 2012/0296907 A1* | 11/2012 | Long ..................... | G06K 9/6224 707/737 |
| 2015/0255061 A1 | 9/2015 | Xue et al. | |
| 2015/0317557 A1* | 11/2015 | Julian .................... | G06N 3/049 706/25 |
| 2016/0086078 A1 | 3/2016 | Ji et al. | |
| 2017/0200077 A1* | 7/2017 | Weston ................. | G06F 40/279 |
| 2017/0351935 A1* | 12/2017 | Liu ....................... | G06K 9/6256 |
| 2018/0068044 A1* | 3/2018 | Erickson ............... | G06N 3/126 |
| 2019/0114511 A1* | 4/2019 | Gao ....................... | G16B 40/00 |
| 2019/0164538 A1* | 5/2019 | Seo ........................ | G10L 15/285 |
| 2020/0302224 A1* | 9/2020 | Jaganathan ............ | G06F 16/58 |

OTHER PUBLICATIONS

Han, Song, Huizi Mao, and William J. Dally. "Deep compression: Compressing deep neural networks with pruning, trained quantization and huffman coding." arXiv preprint arXiv:1510.00149 (2015) (Year: 2015).*

(Continued)

*Primary Examiner* — Vincent Gonzales
(74) *Attorney, Agent, or Firm* — XSENSUS LLP

(57) ABSTRACT

An apparatus comprising circuitry that implements an artificial neural network training algorithm that uses weight tying.

14 Claims, 6 Drawing Sheets

(56) References Cited

OTHER PUBLICATIONS

S. S. Sarwar, S. Venkataramani, A. Raghunathan and K. Roy, "Multiplier-less Artificial Neurons exploiting error resiliency for energy-efficient neural computing," 2016 Design, Automation & Test in Europe Conference & Exhibition (Date), 2016, pp. 145-150. (Year: 2016).*
Song, Yang, Alexander Schwing, and Raquel Urtasun. "Training deep neural networks via direct loss minimization." International Conference on Machine Learning. PMLR, 2016. (Year: 2016).*
Garland, James, and David Gregg. "Low complexity multiply accumulate unit for weight-sharing convolutional neural networks." IEEE Computer Architecture Letters 16.2 (2017): 132-135. (Year: 2017).*
Garland, James, and David Gregg. "Low complexity multiply accumulate unit for weight-sharing convolutional neural networks." IEEE Computer Architecture Letters 16.2 (2017): 132-135.)—This art discusses "weight sharing technique"for purpose of reducing memory size . (Year: 2017).*
Park et al. ( D.-C. Park, O.-H. Kwon and J. Chung, "Centroid Neural Network with a Divergence Measure for GPDF Data Clustering," in IEEE Transactions on Neural Networks, vol. 19, No. 6, pp. 948-957, Jun. 2008, doi: 10.1109/TNN.2007.2000051) (Year: 2008).*
Rastegari, M., et al., "XNOR-Net: ImageNet Classification Using Binary Convolutional Neural Networks", URL: https://arxiv.org/abs/1603.05279, Cornell University Library, 17 Pages total, (Aug. 2, 2016).
Courbariaux, M., et al., "BinaryConnect: Training Deep Neural Networks with Binary Weights during Propagations", URL: https://arxiv.org/abs/1511.00363, Cornell University Library, 9 Pages total, (Apr. 18, 2016).
Fiesler, E., et al., A Weight Discretization Paradigm for Optical Neural Networks, Proceedings of the International Congress on Optical Science and Engineering, vol. SPIE-1281, 8 Pages total, (1990).
White, B.A., et al., "The Digi-Neocognitron: a Digital Neocognitron Neural Network Model for VLSI", IEEE Transactions on Neural Networks, vol. 3, Issue 1, 2 Pages total, (Jan. 1992) (Abstract only).
Simard, P.Y., et al., "Backpropagation without Multiplication", Advances in Neural Information Processing Systems 6 (NIPS 1993), pp. 232-239, (1993).
Marchesi, M., et al., "Fast Neural Networks Without Multipliers", IEEE Transactions on Neural Networks, vol. 4, No. 1, pp. 53-62, (Jan. 1993).
Kwan, H.K., et al., "Multiplierless Multilayer Feedforward Neural Network Design Suitable for Continuous Input-Output Mapping", Electronics Letters, vol. 29, Issue 14, pp. 1259-1260, (Jul. 8, 1993).
Zhu, C., et al., "Trained Ternary Quantization", ICLR 2017, 10 Pages total, (Feb. 23, 2017).
Yunchao Gong et al. "Compressing Deep Convolutional Networks Using Vector Quantization", arXiv preprint arXiv:1412.6115, Dec. 18, 2014, 10 pages.
Yunhe Wang et al. "CNNpack: Packing Convolutional Neural Networks in the Frequency Domain," 30th Conference on Neural Information Processing Systems (NIPS 2016), 2016, 9 pages.

* cited by examiner

APPARATUS AND METHOD FOR TRAINING NEURAL NETWORKS USING WEIGHT TYING

TECHNICAL FIELD

The present disclosure generally pertains to the field of machine learning, in particular to systems and methods that use artificial neural network learning algorithms to perform machine vision or machine control tasks.

TECHNICAL BACKGROUND

Machine learning is the subfield of computer science that gives computers the ability to learn certain aspects without being explicitly programmed. An artificial neural network (ANN) learning algorithm, usually called "neural network", is a computer-implemented learning algorithm in which computations are structured in terms of an interconnected group of artificial neurons. Neural networks model complex relationships between inputs and outputs, to find patterns in data, or to capture the statistical structure in an unknown joint probability distribution between observed variables.

Systems that are based on deep neural networks (DNN) have achieved breakthrough performances in many machine learning applications ranging from speech recognition and natural language processing to computer vision. While DNNs have already made it into many commercial applications, the usage is usually limited to web/cloud based applications where computation can be performed on large servers. The main reason is that, by their nature, DNNs are large and computationally expensive. In fact, the success of DNNs has been driven by the increase in computational power (including the use of graphical processor units).

Using DNNs locally on devices presents a number of challenges, in particular the limited memory availability and the limited computation power of computer systems. In order to leverage the power of DNNs for electronic devices (in contrast to web based applications), implementing DNNs poses the challenges of reducing both their size and their computational complexity.

Although there exist techniques for training artificial networks using prior knowledge, it is generally desirable to provide more efficient techniques for training artificial networks.

SUMMARY

According to a first aspect, the disclosure provides an apparatus comprising circuitry that implements an artificial neural network training algorithm that uses weight tying.

According to a further aspect, the disclosure provides an apparatus comprising circuitry that implements an artificial neural network, the artificial neural network having been trained by a neural network training algorithm that uses weight tying.

According to a further aspect, the disclosure provides a method of training an artificial neural network, the method comprising performing an artificial neural network training algorithm that uses weight tying.

According to a further aspect, the disclosure provides an apparatus comprising a programming interface that is configured to receive weight-tying parameters for use in a neural network training or compression algorithm.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
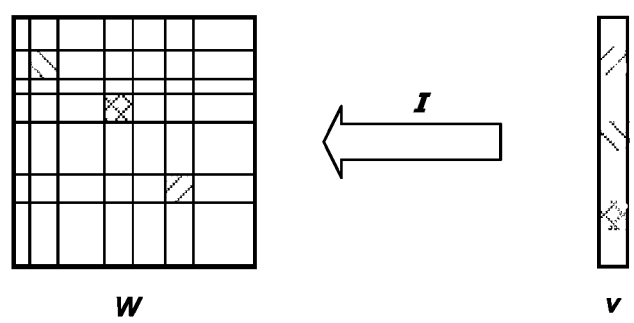
FIG. 1 schematically shows the principle of weight-tying.

The embodiments described below relate to an apparatus comprising circuitry that implements an artificial neural network training algorithm that uses weight tying. The artificial neural network may for example be a deep convolutional neural network. The training algorithm may for example be based on a stochastic gradient descent training algorithm.

Use of prior knowledge about the domain of application of a neural network helps to define the optimal layer type, layer size and number of layers and may also provide information that enables weight-tying. In weight-tying (also called weight-sharing), units can share weights in the network or are working on similar types of data. Weight sharing is applied to increase learning efficiency as it may reduce the number of free parameters being learnt. Weight-tying thus is a technique which allows reducing the memory footprint of a neural network and possibly eliminating the need for multipliers.

The training algorithm may for example be used to train an artificial neural network or to compress existing artificial neural networks before deploying them.

The apparatus may be any device potentially performing recognition, classification or signal generation using an artificial neural network, such as a TV, a camera, a mobile phone, a game console, etc. The apparatus may also be any device that performs controlling functions based on input, such as a lane keeping assist system in semi-autonomous driving, or the like.

The circuitry may be configured to update the weight tying using a predefined number of iterations of a clustering algorithm. For example, a K-means clustering algorithm can be used. K-means clustering is a method of vector quantization, originally from signal processing. The K-means clustering can for example be done using the mean but also using median. According to other embodiments, alternative clustering algorithms can be used. The predefined number of K-means iterations used to update the weight tying may for example be one. That is, according to one embodiment, only one K-means iteration is performed. However, more iterations of K-means may be performed depending on the needs or design goals.

The circuitry may be configured to compute a weight-tied weight matrix based on an index matrix and based on a value vector. Still further, the circuitry may be configured to update, in each iteration of K-means, the value vector and the index matrix based on a full-precision weight matrix.

According to some embodiments, the circuitry is configured to quantize the values of the value vector. For example, the circuitry may be configured to quantize the values of the value vector after updating the weight tying. In particular, the circuitry may be configured to quantize the values of the value vector to the nearest power-of-two.

The value vector v may be fixed to specific values set by the user. As an example, the user may set predefined values for different value vector sizes. According to some embodiments, a value vector used with weight-sharing and quantization may comprise more than three values.

Still further, according to some embodiments, the circuitry may be configured to update full precision weights based on gradients. These gradients may be based on a cost function and based on a weight-tied weight matrix. In particular, the circuitry may be configured to compute the cost function based on a loss function and based on a forward pass. Still further, the circuitry may be configured to compute the cost function also based on a backward pass function.

The embodiments also disclose an apparatus comprising circuitry that implements an artificial neural network, the artificial neural network having been trained by a neural network training algorithm that uses weight tying. In particular, the circuitry may implement the artificial neural network in a multiplierless way. Such an apparatus may be any device potentially performing recognition, classification or signal generation using an artificial neural network, such as a TV, a camera, a mobile phone, a game console etc. The apparatus may also be any device that performs controlling functions based on input, such as a lane keeping assist system in semi-autonomous driving, or the like.

The embodiments also disclose a method of training an artificial neural network, the method comprising performing an artificial neural network training algorithm that uses weight tying.

The embodiments also disclose an apparatus comprising a programming interface that is configured to receive weight-tying parameters for use in a neural network training or compression algorithm. The programming interface may for example be configured to receive a number of quantization levels used for weight-tying, a parameter that indicates if the value vector is fix or updated, constraints to the value vectors, a parameter that indicates that the assignment matrix is fix or can be learnt (updated), an initial or fixed value vector; and/or an initial or fixed assignment matrix. The programming interface may be an application programming interface (API) or a user interface (UI).

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Weight-Tying

Weight parameters usually account for most of the memory used by an artificial neural network. In order to reduce the footprint of the weights, weight-tying limits the number of possible values that the weights can take. Weight-tying as it is described in the embodiments below uses a special representation of neural networks weights. They are represented by an assignment matrix and a value vector for each layer. Both the assignment matrices and the value vectors are jointly optimized (learned) for the specific task of the neural network (e.g. image classification). With some specific constraints on the value vectors it becomes possible to train a network which does not require any multiplication when deployed (i.e. when it is used after training). For example, if the weights for a particular layer can only take two values, each weight can be encoded as a single bit. Similarly, if the weights can take 8 different values, they can be encoded with only three bits. The Weight-tying (WT) approach described in the embodiments below is based on this basic idea that many weights of the same layers are "tied" together and can be assigned to a single value.

FIG. 1 schematically shows the principle of weight-tying. The main idea of weight-tying is to decompose the weight matrix $W \in \mathbb{R}^{O \times I}$ (or tensor for multidimensional input or output) of a particular layer into a value vector $v \in \mathbb{R}^K$ and an index matrix $I \in [1, \ldots, K]^{O \times I}$. The weights $w_{mn}$ are given by $w_{mn} = v_{i_{mn}}$. The number of possible weight values that can be used in this layer is therefore limited to the size of the value vector v. Therefore, only the index matrix I which has O·I indices with each $[\log_2 K]$ Bits and the value vector v which contains K floats needs to be stored.

Training

The embodiments described below provide a training approach to train this special representation of ANN weights by learning both the index matrix and the value vector. During training of weight-tying networks three variables are internally kept for each layer: the float weights W, the value vector v and the index matrix I. When training is finished the float weights W can be discarded and only v and I are used for deployment.

The first step in training a weight-tying network is to initialize v and I. Given some initial float weights $W_{init}$ (e.g. already learned using traditional ANN techniques or initialize randomly or using any other initialization technique), a K-means algorithm is applied to $W_{init}$ to find the initial v and I. Each value of value vector v corresponds to a centroid as obtained from the K-means algorithm and each index in I refers to a cluster as obtained from the K-means algorithm.

Figure 2:
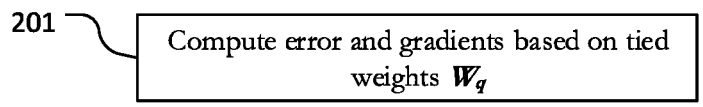
FIG. 2 shows an embodiment of a forward pass that is iteratively applied for neural network training.

Then as for traditional neural network training, a forward and a backward pass are iteratively applied. These two steps are applied as follows:

FIG. 2 shows an embodiment of a forward pass that is iteratively applied for neural network training. At 201, tied weights $W_q = v[I]$ are used to compute error and gradients. A more detailed embodiment of this computation is provided in section "Algorithm" below.

Figure 3:
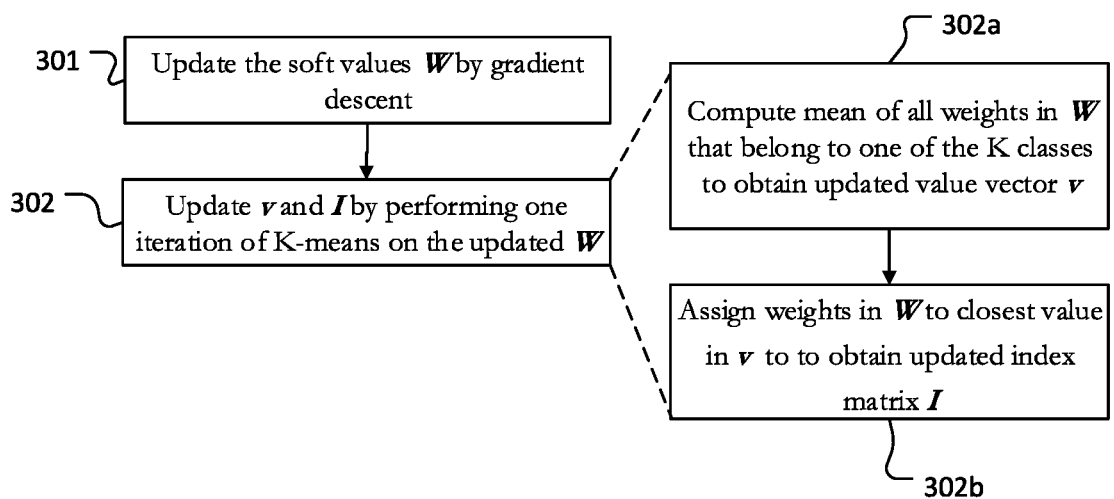
FIG. 3 shows an embodiment of a backward pass that is iteratively applied for neural network training.

FIG. 3 shows an embodiment of backward pass that is iteratively applied for neural network training. At 301, the soft values W are updated by gradient descent. At 302, v and I are updated by performing a default number of one iteration of K-means on the updated W. At 302a, the value vector v is updated by computing the mean of all weights in W that belong to one of the K classes. At 302b, the index matrix I is updated by assigning weights in W to a closest value in v. A more detailed embodiment of these computations is provided in section "Algorithm" below.

With the above described approach of weight-tying also some constraints can be applied on the value vector or the index vector. In the embodiments described below, the specific cases of (1) fixed value vector, (2) fixed index matrix and (3) training a multiplier less network are considered.

(1) Fixed Value Vector

According to this embodiment, the value vector v is fixed to specific values set by the user. As an example the user can set the following values for different value vector sizes K:

$$K=2: v=[-1,1]^T$$

$$K=4: v=[-1,-0.5,0.5,1]^T$$

$$K=8: v=[-1,-0.5,-0.25,-0.125,0.125,0.25,0.5,1]^T$$

In this case, the K-means initialization is replaced by an assignment of each weight to its closest value and step 302a of the backward pass is omitted. Besides the examples given above, it is for example also possible to put a "0" value into v in order to use the weight-tying for pruning the network.

(2) Fixed Index Matrix

In this case, the index assignment defined by K-means clustering at the initialization step is kept during the rest of the training, so step 302b of the backward pass is omitted.

(3) Training a Multiplierless Network

According to the embodiments described below, the value vector v is learnt such that elements are power-of-two numbers. If weights are restricted to powers of two, multiplications usually required when applying the artificial neural network can be avoided and turned into bit-shifts (fixed-point numbers) or additions (floating-point numbers). This avoids the necessity of performing multiplications so that multiplierless processors can be used for training an artificial neural network, which may be more cost efficient and which may provide higher processing speeds.

To achieve this, after each K-means update (i.e. after the initial K-means and after step 302a of the backward pass in FIG. 3), the values are rounded to the nearest power-of-two.

To round to the nearest power of two the following algorithmic schemes is applied:

Let x be a float number which is to be quantized to the nearest power-of-two $x_q = \pm 2^k$.

According to a first quantization scheme, the quantized value is given by $$x_q = \begin{cases} s \cdot 2^{\lfloor b \rfloor} & b - \lfloor b \rfloor \leq \log_2 1.5 \\ s \cdot 2^{\lceil b \rceil} & b - \lfloor b \rfloor > \log_2 1.5 \end{cases}$$

where $s = \text{sign}(x)$ and $b = \log_2 |x|$.

According to this first quantization scheme, the quantization threshold is at $\frac{1}{2}(2^{\lfloor b \rfloor} + 2^{\lceil b \rceil})$. This first quantization scheme has the advantage that it minimizes the (squared) error.

According to an alternative embodiment, the quantized value is given by $$x_q = s \cdot 2^{\text{round}(b)}$$

with a quantization threshold at $\sqrt{2^{\lfloor b \rfloor} \cdot 2^{\lceil b \rceil}}$.

Figure 4:
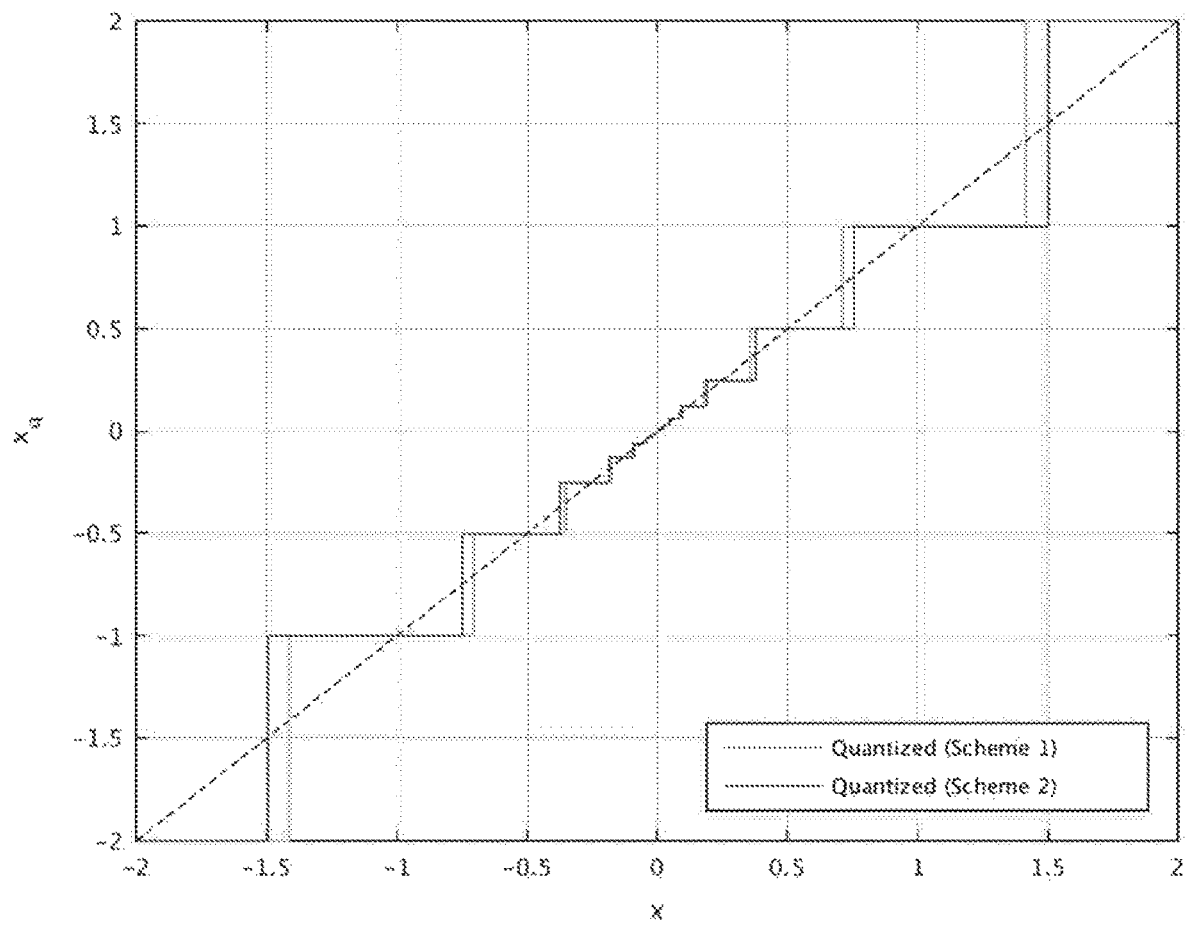
FIG. 4 shows a diagram in which the result of two quantization schemes is depicted.

FIG. 4 shows a diagram in which these two quantization schemes are depicted. On the horizontal axis the float number x which is to be quantized is plotted. On the vertical axis the respective quantized value $x_q$ that corresponds to x is plotted for each of the quantization schemes.

The embodiments disclosed here provide a "quantized" artificial neural network where the quantized values can be learnt by the algorithm. By optimizing the values during training, better results can be obtained than by setting the value arbitrarily. Some additional constraints can be imposed by the user, such as using only power of two values which allows to avoid multiplication and make the artificial neural network computationally efficient.

In the embodiments described above a training approach to train ANN weights by learning both the index matrix and the value vector has been described. This training approach may be used as a learning algorithm for training an artificial neural network. As the training approach described in the embodiment may provide a more efficient artificial neural network, it may also be used to compress an existing artificial neural network. This can be achieved by using the weights of an existing artificial neural network as starting point of the training algorithm.

Algorithm

In the following an embodiment of stochastic gradient descent (SGD) training with weight-tying is described in more detail. The algorithm is performed with minibatches of training data. Each minibatch is a subset of the training data containing inputs x and targets t. For the weight-tying scheme, the bias vectors are learned as in a traditional (full-precision) network and for simplicity they are ignored in the further discussion of the algorithm.

With each minibatch {x, t}, the following calculations are performed:

In a first step, the weight-tied weight matrix $W_{wt}^{(l)}$ is computed for layers l=1, ..., L (of affine or convolutional layer) based on the index matrix $I^{(l)}$ for layer l and the value vector $v^{(l)}$ for layer l:

for l=1 to L do $$W_{wt}^{(l)} = v^{(l)}[I^{(l)}]$$

In a second step, the current cost C and gradients $G^{(l)}$ are computed:

$$C = \text{Loss}(t, \text{Forward}(x, W_{wt}^{(1)}, \ldots, W_{wt}^{(L)}))$$

$$\{G^{(1)}, \ldots, G^{(L)}\} = \frac{\partial C}{\partial W_{wt}^{(l)}} = \text{Backward}(x, t, W_{wt}^{(1)}, \ldots, W_{wt}^{(L)})$$

C is the cost function that is to be minimized.

Loss(t,$\hat{t}$) is the Loss function that computes the error of predicting $\hat{t}$ whereas t is the ground truth.

Forward(x,$W^{(1)}$, ..., $W^{(L)}$) is the function that describes the forward pass of the neural network with input data x and weights $W^{(1)}$, ..., $W^{(L)}$. The function returns the output node values.

Backward(x,t,$W^{(1)}$, ..., $W^{(L)}$) is the function that describes the backward pass of the neural network with input data x, targets t and weights $W^{(1)}$, ..., $W^{(L)}$. The function returns the gradients of the weights.

In a third step, the full precision weights are updated:

for l=1 to L do $$W^{(l)} = W^{(l)} - \eta G^{(l)}$$

Here, $W^{(l)}$ is the full-precision weight matrix for layer l=1, ..., L (of affine or convolutional layer) and η is the learning rate of SGD.

In a fourth step, the weight tying is updated using M iterations of K-means:

for $l = 1$ to $L$ do for $m = 1$ to $M$ do $[I^{(l)}]_{ij} = \text{argmin}_{k=1,\ldots,K^{(l)}} \left| [W^{(l)}]_{ij} - [v^{(l)}]_k \right|$ for $k = 1$ to $K^{(l)}$ do $$[v^{(l)}]_k = \frac{1}{\#\{I^{(l)} = k\}} \sum_{ij, I^{(l)}=k} [W^{(l)}]_{ij}$$

The value vectors $v^{(l)}$ are updated by computing the means of all weights in $W^{(l)}$ that belong to one of the $K^{(l)}$ classes. Each value of value vector $[v^{(l)}]_k$ corresponds to a centroid as obtained from the K-means iteration. The updated value at index k is the average of all weights in the corresponding cluster. Therefore it is the sum of the weights in the cluster divided by the number of weights in the cluster (i.e. number of weights with index corresponding to the value k: $\#\{I^{(l)}=k\}$).

The index matrix I is updated by assigning weights in W to the closest value in v. Each index in $[I^{(l)}]_{ij}$ refers to the cluster as obtained from the K-means algorithm. $[v^{(l)}]_k$ is the value k of layer l and arg $\min_{k=1,\ldots,K^{(l)}} |[W^{(l)}]_{ij} - [v^{(l)}]_k|$ is returning the index of the closest value from the weight $[W^{(l)}]_{ij}$.

Here, $K^{(l)}$ is the number of values in values vector $v^{(l)}$ and M is the number of K-means iterations done after each minibatch update. The number M can be chosen arbitrarily. A default value is M=1, but more iterations may be performed. Furthermore, it is also possible to perform the K-means update only after a certain number of minibatch updates in order to reduce the computational complexity of the weight-tying training.

In this fourth step, in order to obtain a multiplierless network, the values of the value vector are in addition rounded to the closest power-of-two number as it was described in the embodiments above.

It should also be noted that in step four the update of I and v can also be done in the reverse order.

In the embodiment described here, SGD is used as deep neural network optimization strategy. However, instead of SGD, also other deep neural network optimization strategies could be used like Adam, RMSprop, or the like. In such a case, "Step 3" of the algorithmic description would be modified according to the needs of the applied deep neural network optimization strategy.

It should also be noted that one can also consider tying together weights from of only a part of a layer (e.g. weights leading to a single output map in a convolution network) or tying weights from different layers together.

Implementation

Figure 5:
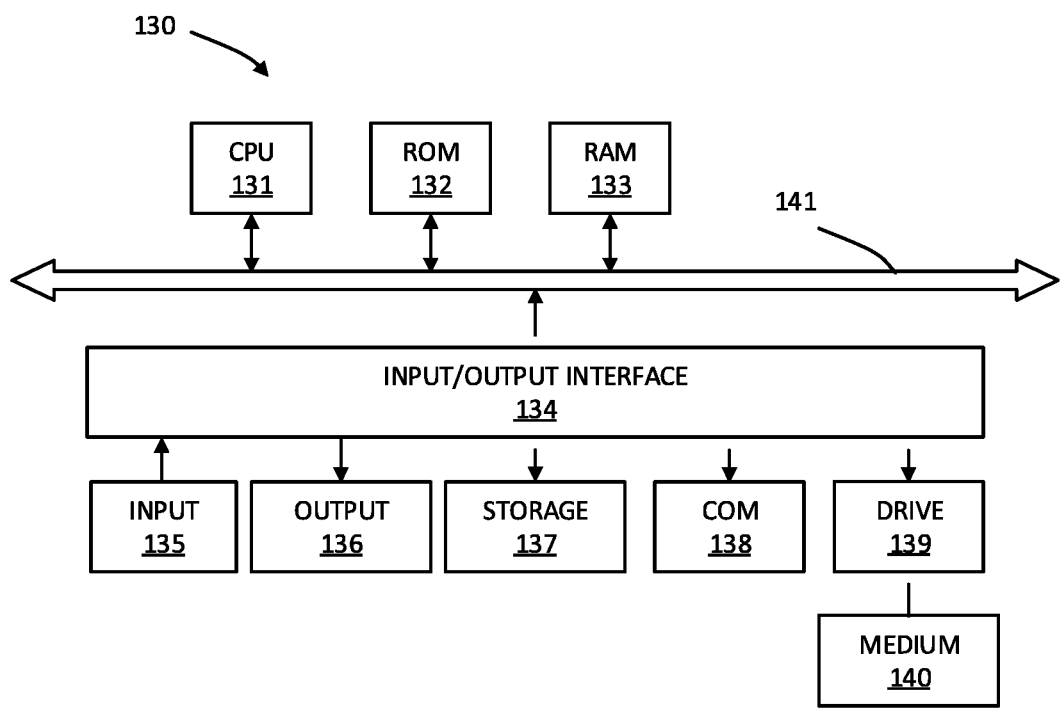
FIG. 5 shows an embodiment of a computer that implements an artificial neural network.

In the following, an embodiment of a computer 130 that implements an artificial neural network is described under reference of FIG. 5. The computer 130 can be used to implement the training algorithms described above, and/or it may be used to implement an artificial neural network that has been generated by a training algorithm as described above.

The computer has components 131 to 140, which can form circuitry to implement artificial neural networks and training algorithms.

Embodiments, which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140, which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise when it functions as a base station, and user equipment.

CPU 131 may comprise hardware that is specialized for implementation of artificial neural networks. Hardware that is specialized for implementation of artificial neural networks may for example be a parallel computing processor. CPU 131 may also use a GPU-accelerated deep neural network implementation. In particular, CPU 131 may comprise a multiplierless processor. Using a multiplierless processor may make the implementation more efficient in terms of processing speed and costs.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with less, additional or other sensors, storage devices, interfaces or the like.

Figure 6:
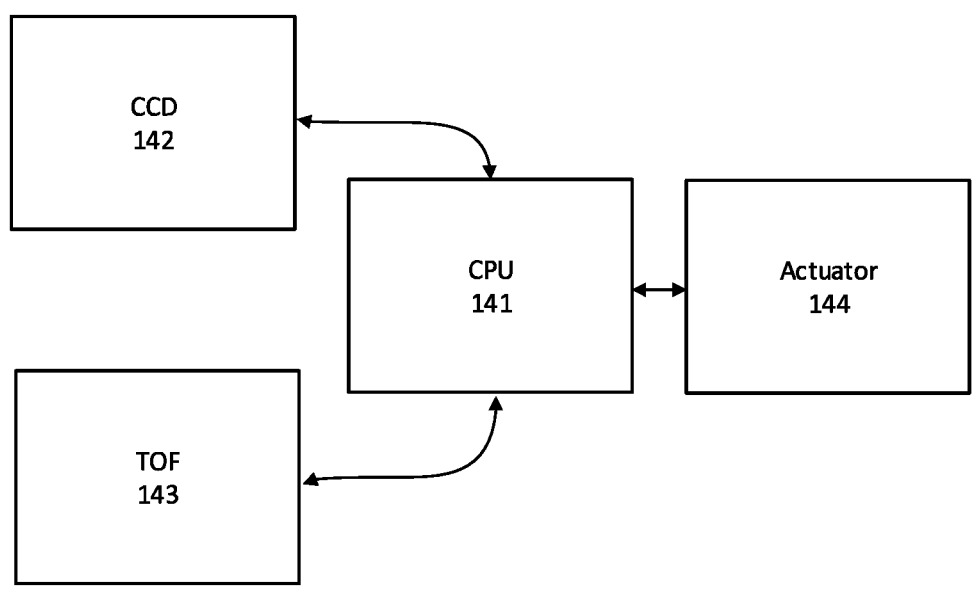
FIG. 6 shows an embodiment of a machine that uses a trained artificial neural network.

FIG. 6 shows an embodiment of a machine that uses a trained artificial neural network. The machine comprises a processor 141 that is specialized for implementing the artificial neural network. The processor 141 receives input from a CCD camera 142 and a TOF camera 142. The input is processed in the artificial neural network implemented in the processor 141 to provide output. The output of the artificial neural network controls an actuator 144 to perform a specific action. For example, the artificial neural network may be trained for various functions in the context of autonomous or semi-autonomous driving such as lane keeping assistance, recognizing objects on the road, pedestrian recognition, solving traffic problems, mapping the raw pixels from a front-facing camera to the steering commands for a self-driving car, or the like. Based on the input from the CCD camera 142 and the TOF camera 142 the artificial neural network may judge whether the driving direction needs a correction in order to keep the lane. According to the output of the artificial neural network, the system may act on the steering of the car by controlling actuator 144.

Figure 7:
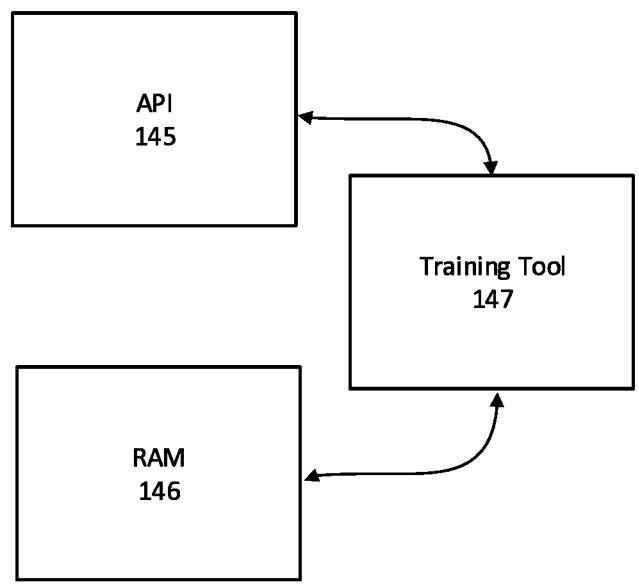
FIG. 7 shows an embodiment of a software or computer device that is configured to train an artificial neural network or to compress an existing artificial neural network before deploying it.

FIG. 7 shows an embodiment of a software or computer device that is configured to train an artificial neural network or to compress an existing artificial neural network before deploying it. The device comprises a processor that is configured as an ANN training tool 147 and to implement an artificial neural network training algorithm. The device further comprises a memory 146 that is configured to store ANN data such as weights, value vectors, index matrices and the like. Still further, the device comprises a programming interface 145 by which a user can provide parameters to the ANN training tool 147. The programming interface may for example be configured to receive weight-tying parameters that are used to control the weight-tying aspects of a training or compression algorithm. Weight-tying parameters may for example be parameters such as a number of quantization levels used for weight-tying, a parameter that indicates if the value vector is fix or can be learnt (updated), constraints to the value vectors, a parameter that indicates that the assignment matrix is fix or updated, an initial or fixed value vector; and/or an initial or fixed assignment matrix.

It should be recognized that the embodiments describe methods with an exemplary ordering of method steps. The specific ordering of method steps is however given for illustrative purposes only and should not be construed as binding. For example, steps 302a and 302b in FIG. 3 could be performed in reverse order without changing the result.

It should also be recognized that the division of the control or circuitry of FIG. 7 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An apparatus comprising circuitry that implements an artificial neural network training algorithm that uses weight tying.

(2) The apparatus of (1), wherein the circuitry is configured to update the weight tying using a predefined number (M) of iterations of a clustering algorithm.

(3) The apparatus of (1) or (2), wherein the circuitry is configured to compute a weight-tied weight matrix ($W_{wt}^{(l)}$) based on an index matrix ($I^{(l)}$) and based on a value vector ($v^{(l)}$).

(4) The apparatus of (2), wherein the predefined number (M) of iterations of the clustering algorithm used to update the weight tying is one.

(5) The apparatus of anyone of (2) to (4), wherein the circuitry is configured to, in each iteration of the clustering algorithm, update a value vector ($v^{(l)}$) according to $$[v^{(l)}]_k = \frac{1}{\#\{I^{(l)} = k\}} \sum_{ij, I^{(l)}=k} [W^{(l)}]_{ij}$$

where $W^{(l)}$ is a full-precision weight matrix for layer l of the neural network, and $I^{(l)}$ is the index matrix.

(6) The apparatus of anyone of (2) to (5), wherein the circuitry is configured to update, in each iteration of the clustering algorithm, an index matrix ($I^{(l)}$) according to $$[I^{(l)}]_{ij} = \arg\min_{k=1,\ldots,K^{(l)}} |[W^{(l)}]_{ij} - [v^{(l)}]_k|$$

(7) The apparatus of anyone of (3) to (6) as far as dependent on (3), wherein the circuitry is configured to quantize the values of the value vector.

(8) The apparatus of anyone of (3) to (7), wherein the circuitry is configured to quantize the values of the value vector after updating the weight tying.

(9) The apparatus of (8), wherein the circuitry is configured to quantize the values of the value vector to the nearest power-of-two.

(10) The apparatus of (8) or (9), wherein the circuitry is configured to quantize the values of the value vector according to the quantization scheme:

$$x_q = \begin{cases} s \cdot 2^{\lfloor b \rfloor} & b - \lfloor b \rfloor \leq \log_2 1.5 \\ s \cdot 2^{\lceil b \rceil} & b - \lfloor b \rfloor > \log_2 1.5 \end{cases}$$

where s=sign(x) and b=$\log_2|x|$, and where x is the value which is to be quantized and $x_q$ is the quantized value.

(11) The apparatus of anyone of (3) to (10), wherein a value vector comprises more than three values.

(12) The apparatus of anyone of (1) to (11), wherein the circuitry is configured to update full precision weights based on gradients ($G^{(l)}$).

(13) The apparatus of (12), wherein the circuitry is configured to compute the gradients ($G^{(l)}$) based on a cost function (C) and based on the weight-tied weight matrix ($W_{wt}^{(l)}$).

(14) The apparatus of (12) or (13), wherein the circuitry is configured to compute the cost function (C) based on a loss function and based on a forward pass function (Forward (x,$W^{(1)}$, . . . , $W^{(L)}$)).

(15) The apparatus of anyone of (12) to (14), wherein the circuitry is configured to compute the gradients ($G^{(l)}$) based on a backward pass function (Backward(x,t,$W_{wt}^{(1)}$, . . . , $W_{wt}^{(L)}$))

(16) The apparatus of anyone of (1) to (15), wherein the training algorithm is a stochastic gradient descent training algorithm.

(17) The apparatus of anyone of (1) to (16), wherein the artificial neural network is a deep convolutional neural network.

(18) An apparatus comprising circuitry that implements an artificial neural network, the artificial neural network having been trained by a neural network training algorithm that uses weight tying.

(19) The apparatus of (17), wherein in the circuitry implements the artificial neural network multiplierless.

(20) A method of training an artificial neural network, the method comprising performing an artificial neural network training algorithm that uses weight tying.

(21) An apparatus comprising a programming interface that is configured to receive weight-tying parameters for use in a neural network training or compression algorithm.

(22) The apparatus of (21) in which the programming interface is configured to receive:
  a number of quantization levels used for weight-tying;
  a parameter that indicates if the value vector is fix or updated;

constraints to the value vectors;
a parameter that indicates that the assignment matrix is fix or updated;
an initial or fixed value vector; and/or
an initial or fixed assignment matrix.

(23) A computer program comprising program code causing a computer to perform the method according to (20) when being carried out on a computer.

(24) A non-transitory computer-readable recording medium that stores therein a computer program product, which, when executed by a processor, causes the method according to (20) to be performed.

The present application claims priority to European Patent Application 17158959.1 filed by the European Patent Office on 2 Mar. 2017, the entire contents of which being incorporated herein by reference.

The invention claimed is:

1. An apparatus comprising:
circuitry that implements an artificial neural network training algorithm that uses weight tying, wherein the circuitry is configured to
compute a weight-tied weight matrix based on an index matrix and based on a value vector;
update the weight tying using a predefined number of iterations of a clustering algorithm to update the index matrix; and
quantize values of the value vector after updating the weight tying, wherein
the circuitry is configured to, in each iteration of the clustering algorithm, update a value vector according to $$[v^{(l)}]_k = \frac{1}{\#\{I^{(l)}=k\}} \sum_{ij,I^{(l)}=k} [W^{(l)}]_{ij}$$

where $W^{(l)}$ is a full-precision weight matrix for layer l of the neural network, $I^{(l)}$ is the index matrix, i and j denote rows and columns, respectively, of $W^{(l)}$ and $I^{(l)}$, and k denotes a value index.

2. The apparatus of claim 1, wherein the predefined number of iterations of the clustering algorithm used to update the weight tying is one.

3. The apparatus of claim 1, wherein the circuitry is configured to update, in each iteration of the clustering algorithm, the index matrix according to $$[I^{(l)}]_{ij} = \arg\min_{k=1,\ldots,K^{(l)}} \left| [W^{(l)}]_{ij} - [v^{(l)}]_k \right|$$

where $W^{(l)}$ is a full-precision weight matrix for layer l of the neural network, $I^{(l)}$ is the index matrix, i and j denote rows and columns, respectively, of $W^{(l)}$ and $I^{(l)}$, and k denotes a value index.

4. The apparatus of claim 1, wherein the circuitry is configured to quantize the values of the value vector to the nearest power-of-two.

5. The apparatus of claim 4, wherein the circuitry is configured to quantize the values of the value vector according to the quantization scheme:

$$x_q = \begin{cases} s \cdot 2^{\lfloor b \rfloor} & b - \lfloor b \rfloor \leq \log_2 1.5 \\ s \cdot 2^{\lceil b \rceil} & b - \lfloor b \rfloor > \log_2 1.5 \end{cases}$$

where s=sign(x) and h=$\log_2 |x|$, and where x is the value which is to be quantized and $x_q$ is the quantized value.

6. The apparatus of claim 1, wherein the circuitry is configured to compute the weight-tied weight matrix based on the index matrix and based on the value vector that comprises more than three values.

7. The apparatus of claim 1, wherein the circuitry is configured to update full precision weights based on gradients.

8. The apparatus of claim 1, wherein the circuitry is configured to compute the gradients based on a cost function and based on the weight-tied weight matrix.

9. The apparatus of claim 7, wherein the circuitry is configured to compute the cost function based on a loss function and based on a forward pass function.

10. The apparatus of claim 7, wherein the circuitry is configured to compute the gradients based on a backward pass function.

11. The apparatus of claim 1, wherein the training algorithm is a stochastic gradient descent training algorithm.

12. The apparatus of claim 1, wherein the artificial neural network is a deep convolutional neural network.

13. A method of training an artificial neural network, the method comprising:
performing an artificial neural network training algorithm that uses weight tying;
computing a weight-tied matrix based on an index matrix and based on a value vector;
update the weight tying using a predefined number of iterations of a clustering algorithm to update the index matrix; and
quantizing values of the value vector after updating the weight tying, wherein
updating the weight tying includes, in each iteration of the clustering algorithm, updating a value vector according to $$[v^{(l)}]_k = \frac{1}{\#\{I^{(l)}=k\}} \sum_{ij,I^{(l)}=k} [W^{(l)}]_{ij}$$

where $W^{(l)}$ is a full-precision weight matrix for layer l of the neural network, $I^{(l)}$ is the index matrix, i and j denote rows and columns, respectively, of $W^{(l)}$ and $I^{(l)}$, and k denotes a value index.

14. A non-transitory computer-readable medium encoded with computer-readable instructions that, when executed by a processor, cause the processor to perform a method comprising:
performing an artificial neural network training algorithm that uses weight tying;
computing a weight-tied matrix based on an index matrix and based on a value vector;
update the weight tying using a predefined number of iterations of a clustering algorithm to update the index matrix; and
quantizing values of the value vector after updating the weight tying, wherein
updating the weight tying includes, in each iteration of the clustering algorithm, updating a value vector according to $$[v^{(l)}]_k = \frac{1}{\#\{I^{(l)} = k\}} \sum_{ij, I^{(l)}=k} [W^{(l)}]_{ij}$$

where $W^{(l)}$ is a full-precision weight matrix for layer l of the neural network, $I^{(l)}$ is the index matrix, i and j denote rows and columns, respectively, of $W^{(l)}$ and $I^{(l)}$, and k denotes a value index.

* * * * *